F. A. BROWNELL.
PHOTOGRAPHIC PRINTING DEVICE.
APPLICATION FILED MAR. 30, 1906.
1,060,813.
Patented May 6, 1913.
8 SHEETS—SHEET 5.
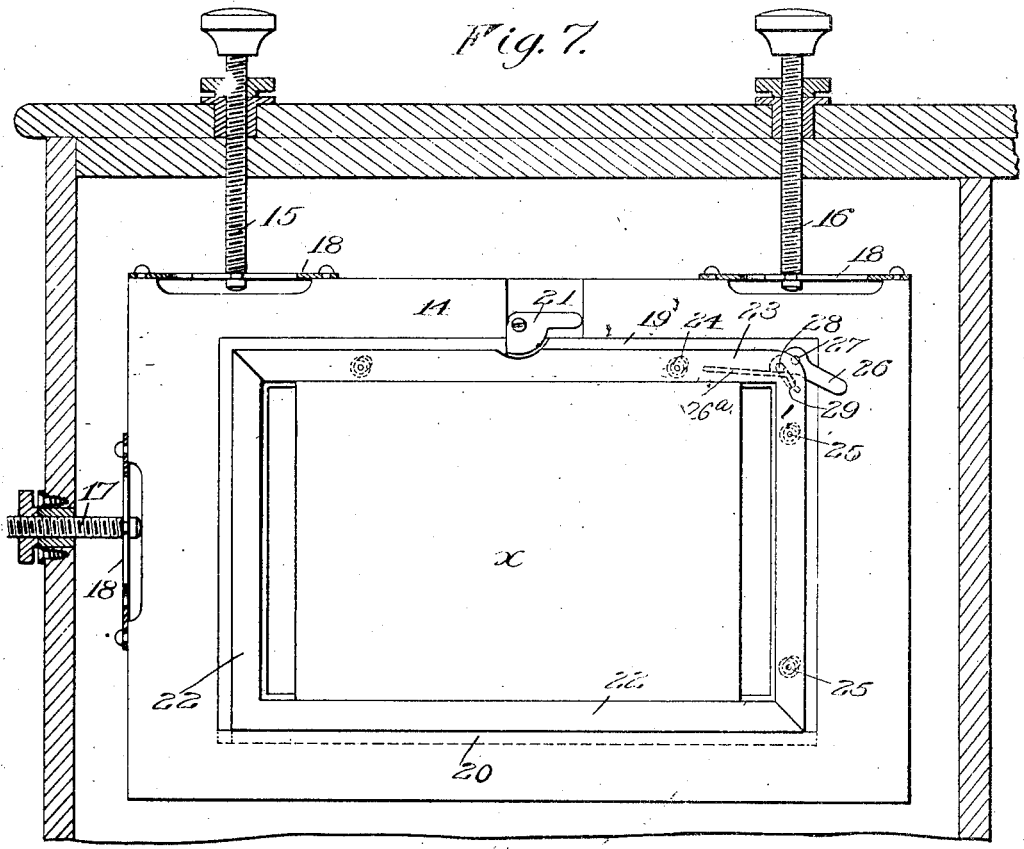
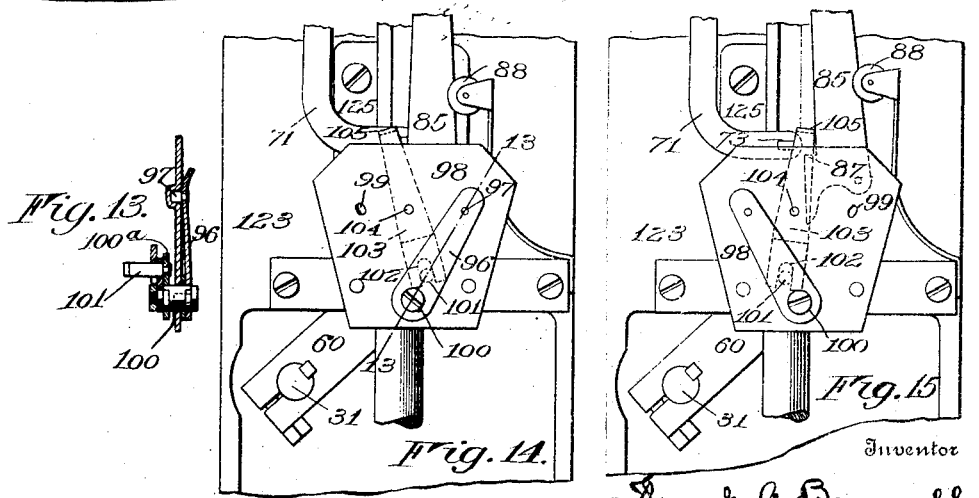

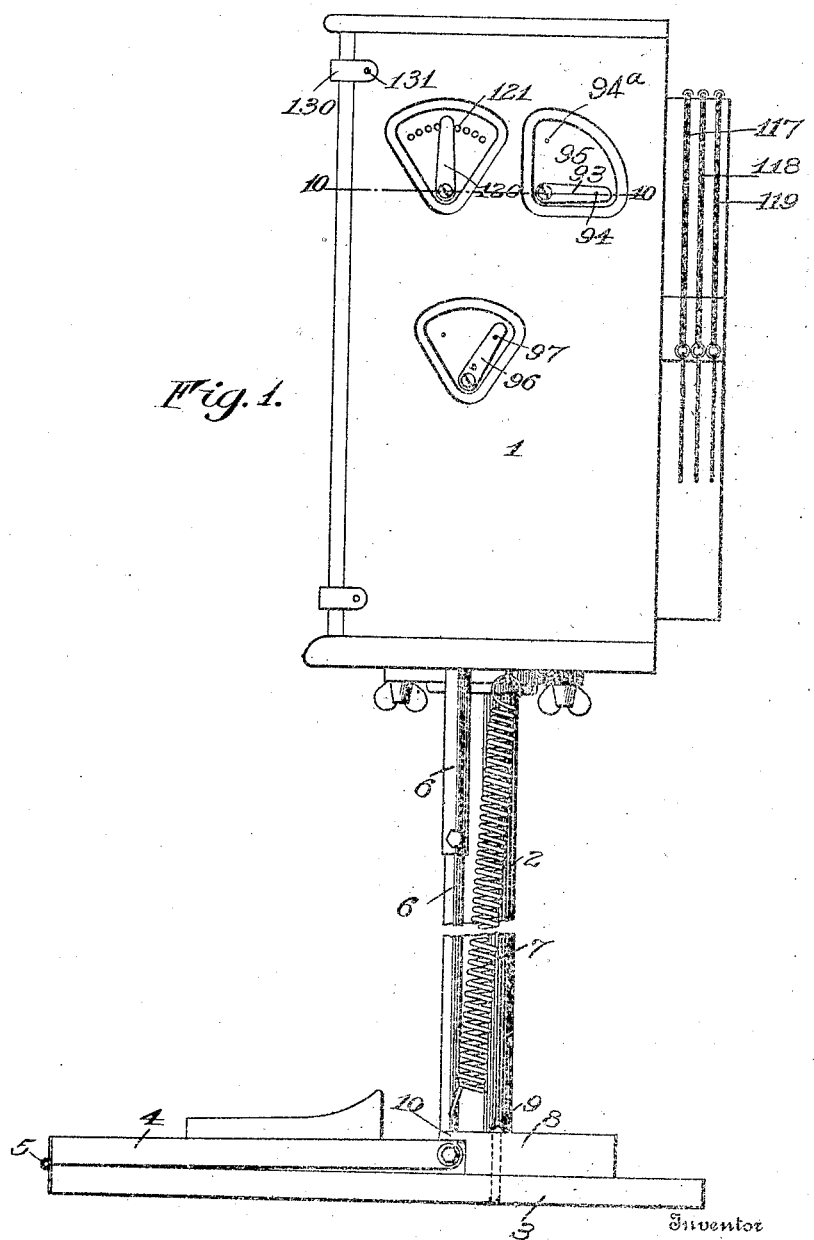

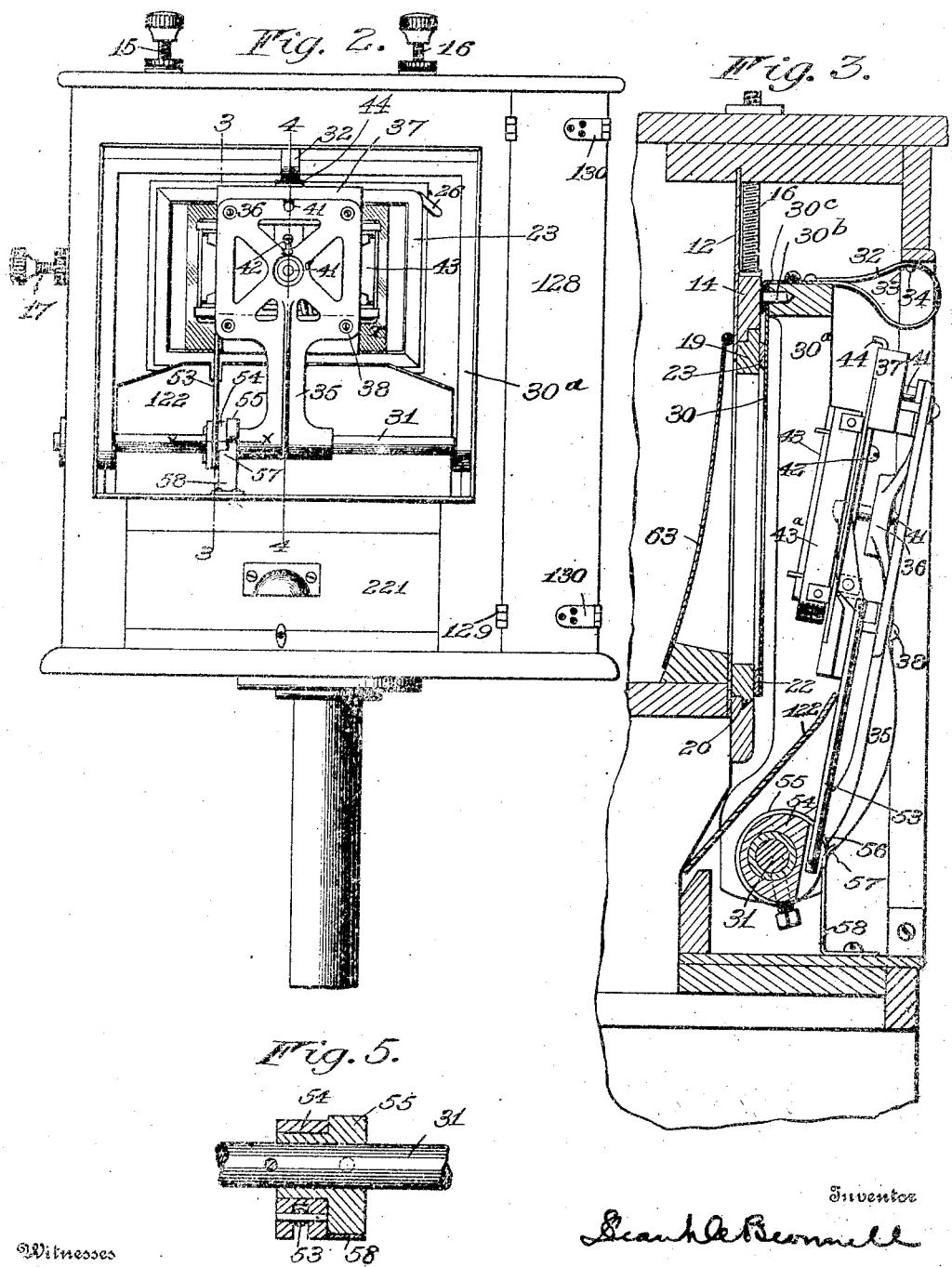

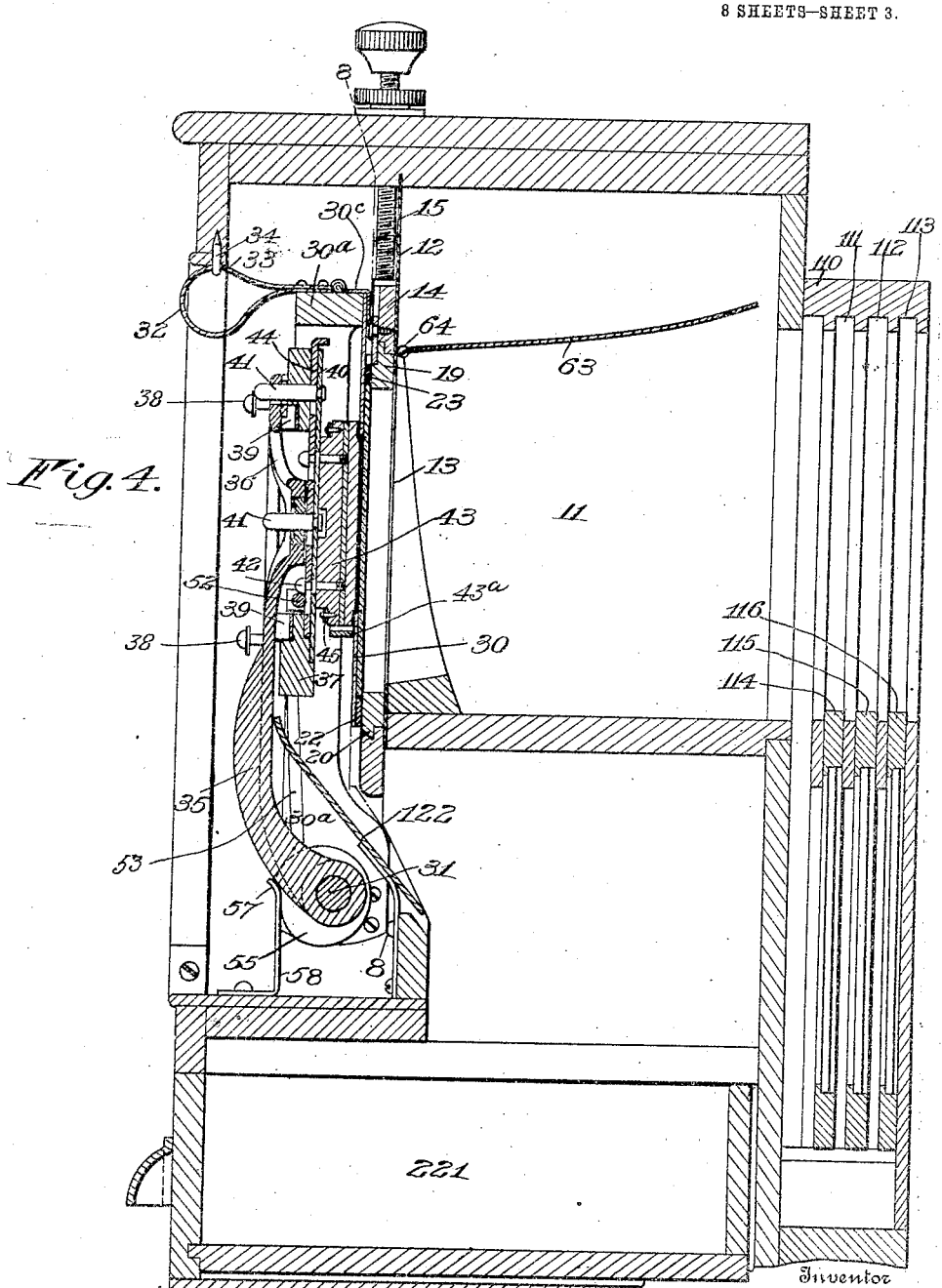

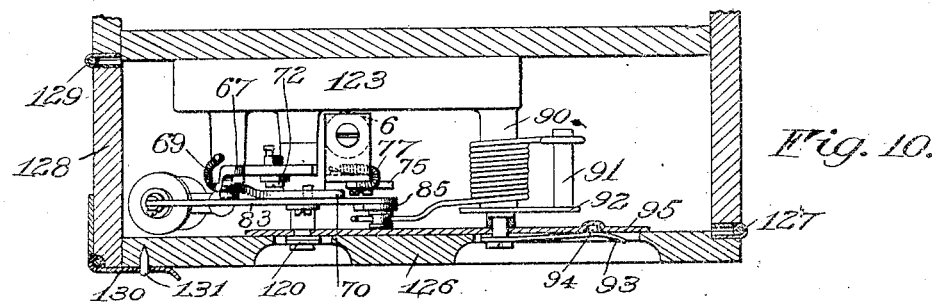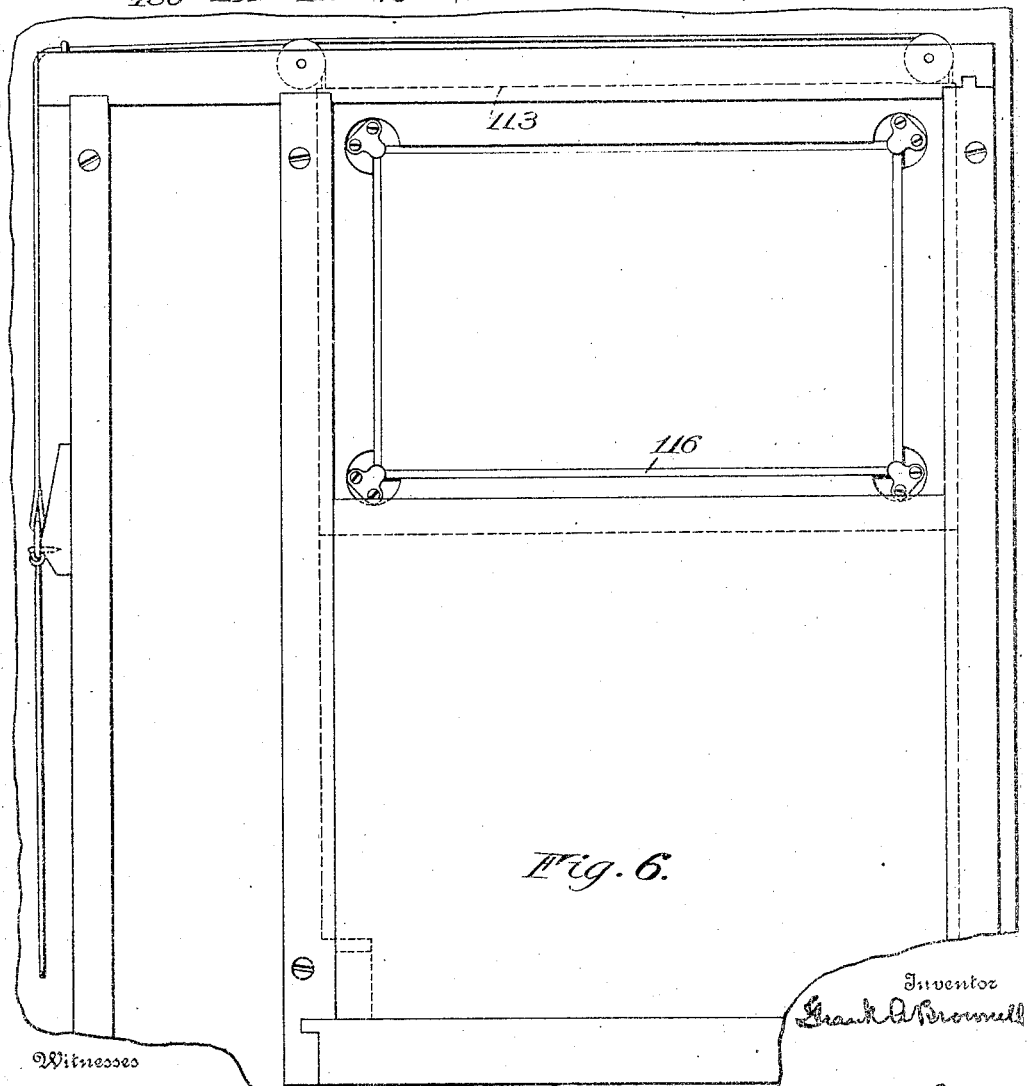

F. A. BROWNELL.
PHOTOGRAPHIC PRINTING DEVICE.
APPLICATION FILED MAR. 30, 1906.

1,060,813.

Patented May 6, 1913.
8 SHEETS—SHEET 6.

Witnesses
Walter B. Payne
Clarence A. Bateman

Inventor
Frank A. Brownell
By Frederick S. Church
His Attorney

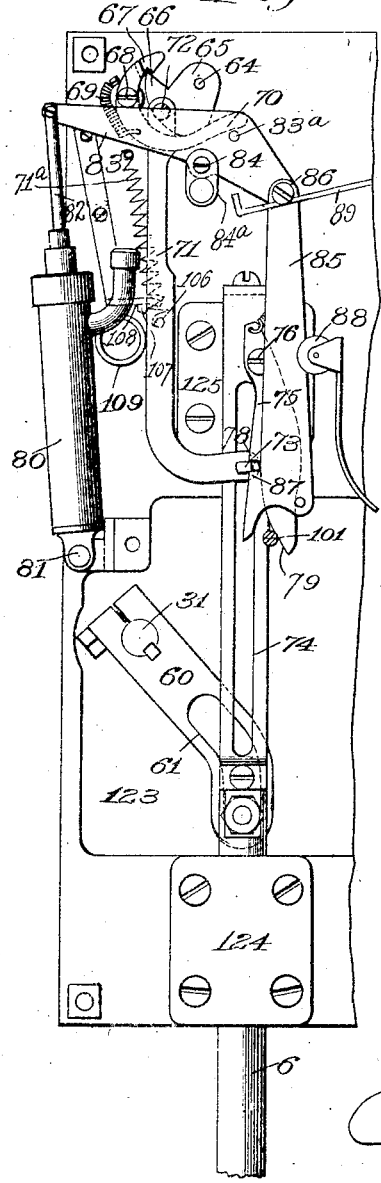
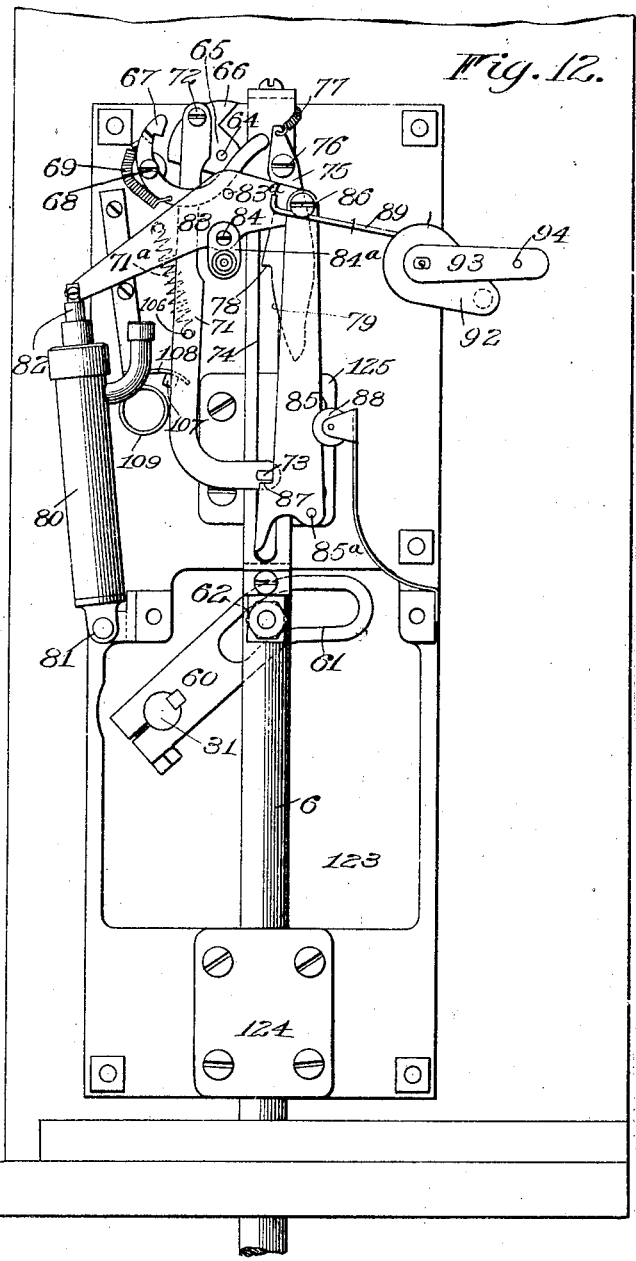

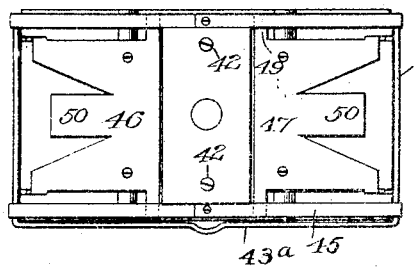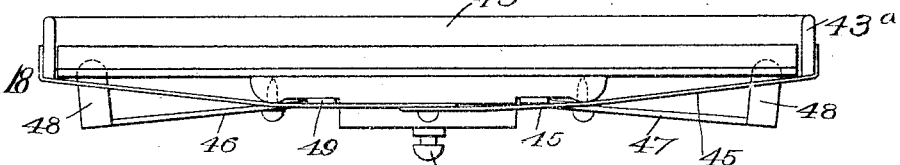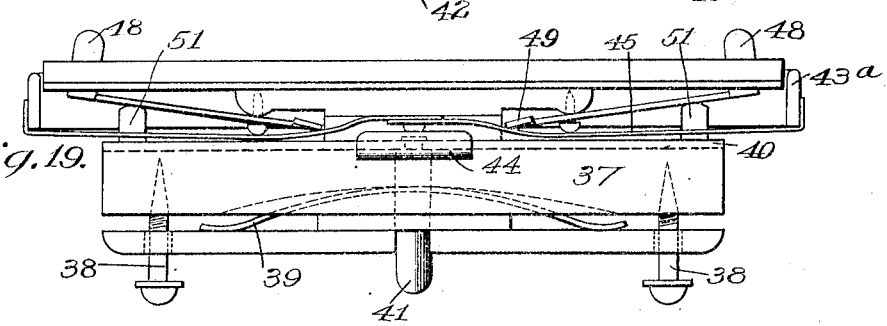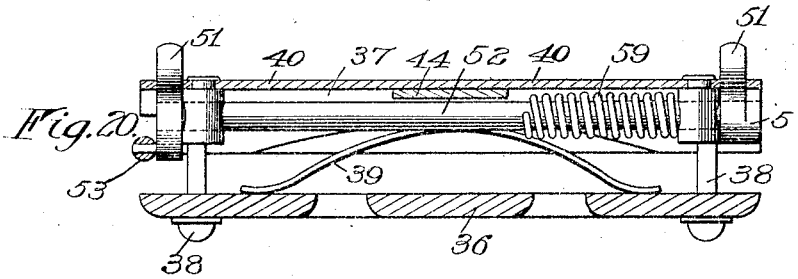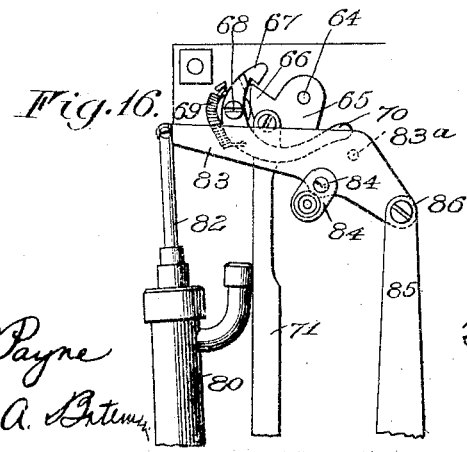

UNITED STATES PATENT OFFICE.

FRANK A. BROWNELL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-PRINTING DEVICE.

1,060,813.　　　Specification of Letters Patent.　　Patented May 6, 1913.

Application filed March 30, 1906. Serial No. 308,994.

*To all whom it may concern:*

Be it known that I, FRANK A. BROWNELL, of Rochester, in the county of Monroe and State of New York, have invented certain new and useful Improvements in Photographic-Printing Devices; and I do hereby declare the following to be a full, clear, and exact description of the same, reference being had to the accompanying drawings, forming a part of this specification, and to the reference-numerals marked thereon.

My present invention relates to improvements in means for exposing photographic or other suitably-sensitized materials, and the object of the invention is to provide a device of this kind which is particularly adapted to facilitate the operation of making a number of prints from negatives, embodying suitable means for positioning the material to be exposed relatively to the negative, and an appropriate shutter having devices capable of timing the exposures either automatically or at the will of the operator, suitable accessories being also provided whereby printing from negatives, for instance, is facilitated, while the prints obtained from each negative will be uniformly and properly exposed.

In these and other ends the invention consists in certain improvements and combinations of parts, all as will be hereinafter more fully explained, the novel features being pointed out in the claims at the end of the specification.

Figure 8:
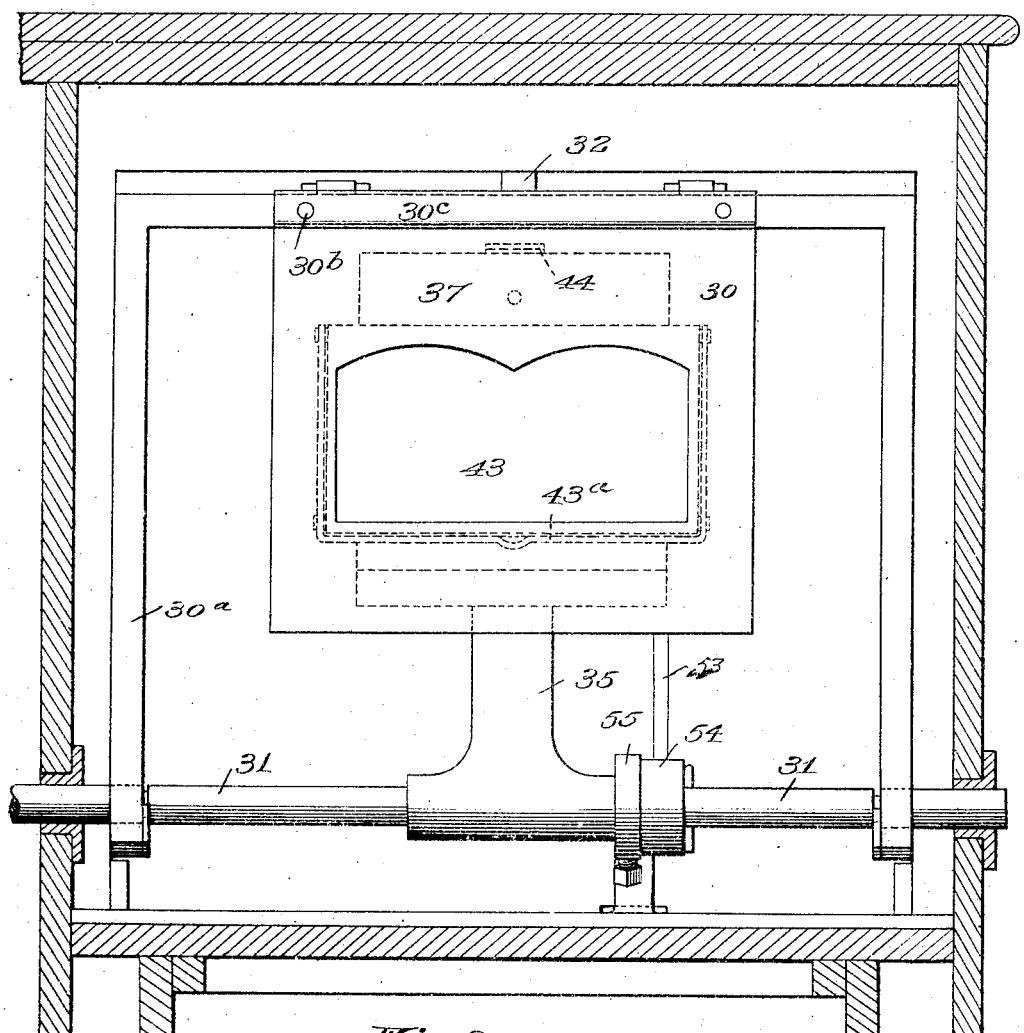
Figure 9:
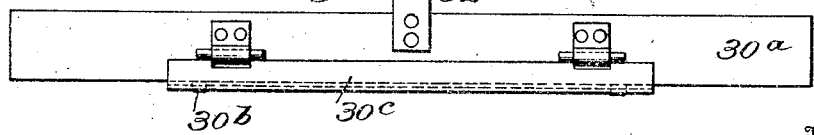

In the drawings: Figure 1 is an elevation of a printing machine constructed in accordance with my invention. Fig. 2 is a view of the upper portion of the machine as viewed from the left in Fig. 1. Fig. 3 represents an enlarged section on the line 3—3 of Fig. 2, the shutter being closed and the platen partially retracted. Fig. 4 represents a section on the line 4—4 of Fig. 2, the parts being shown in printing or exposing position. Fig. 5 represents a section on the line x—x of Fig. 2. Fig. 6 shows the printing device as viewed from the right in Fig. 4, one of the screens being shown in operative position. Fig. 7 represents a section taken transversely through the casing, showing an adjustably supported negative holder. Fig. 8 represents a section on the line 8—8 of Fig. 4 showing a vignetter or mask such as is usually employed in print-
ing stereoscopic views. Fig. 9 is a top plan view of the vignetter or mask holder. Fig. 10 represents a horizontal section on the line 10—10 of Fig. 1. Figs. 11 and 12 represent the operating and controlling devices for the shutter and the platen, the parts being shown in exposing position in Fig. 11, while Fig. 12 shows the position of the parts at the termination of the exposure. Figs. 13, 14 and 15 show the device for setting the shutter for automatic or for manually timed exposures, and vice versa, Fig. 13 being a section on line 13—13 of Fig. 14. Fig. 16 is a detail view of the latching device for detaining the shutter, and Figs. 17 to 20 inclusive show the construction of the platen and its coöperating parts as employed in the present embodiment.

The present embodiment of my invention comprises generally a suitable casing 1 forming a printing or exposure chamber, having the negative holder, platen, shutter, and the other necessary parts employed in the printing operations coöperatively arranged therewith, the casing being supported on a standard or pillar 2, which in turn is arranged on a base 3, the latter in the present instance containing a treadle 4 pivoted to the base at 5, and having a main operating bar or member 6 connecting it with the shutter and platen operating mechanism in the upper casing, a spring 7 normally operating to return the treadle to normal elevated position after each operation, a locking or detaining device 8 being preferably provided to hold the treadle in operated position, when desired, this detaining device in the present instance comprising a detent pivoted at 9 and having a projection 10 arranged to move into coöperative engagement with a part of the treadle to retain it depressed.

The printing mechanism proper contained in the upper casing comprises, in the present instance, a substantially closed printing or exposure chamber 11 having an aperture at one end to receive light from a suitable source, while its opposite end is closed by a diaphragm 12, having an aperture 13 therein through which the light rays pass to the negative and the sensitized material. The negative (see Fig. 7) is held in operative position by a negative holder comprising an outer frame 14, supported within the casing by means of vertically-adjustable screws 15 and 16 and a horizontally-adjustable screw 17, the several screws operating on the bearing plates 18 to vary the position of the negative holder laterally and vertically in a vertical plane. Fitted removably within the outer frame 14 is an inner frame 19, the latter having a beveled edge 20 thereon arranged to enter an undercut groove in the outer frame to permit their engagement and disengagement and to prevent lateral disengagement of the two frames when locked, the opposite or upper edges of the two frames being held in coöperative relation by a button 21. The inner frame has a form to receive a negative $x$, comprising a relatively fixed angle member 22, the arms of which are arranged preferably at right angles, and a corresponding diagonally-adjustable member 23, the latter having inclined slots 24 therein adapted to coöperate with the projections 25. An operating lever 26 pivoted at 27 has a projection 28 resting in an aperture 29 of the movable member of the form, so that by operating this member, a relative diagonal movement will be given the members that will cause their opposing edges to proximate or move toward one another, and when a negative is properly placed in the form it will be firmly clamped in position. A spring $26^a$ coöperating with the projection 28 serves to normally retain the lever 26 in position to secure the negative.

It is preferable to employ, in some instances, a vignetter or mask for limiting the field of exposure so as to provide a border around the print or for other desired effects, such as tinting, and in such cases it is convenient to support the vignetter or other forms indicated at 30 on a movable frame $30^a$, the latter for convenience being mounted to swing on a shaft 31 to permit it to be swung into and out of coöperative relation with the negative, the mask or vignetter being preferably detachably fastened by impaling it on projections $30^b$ and locking it by swinging the hinged bar $30^c$ behind it, a handle 32 being attached to the frame provided with an aperture 33 arranged to coöperate with the projection 34 on the casing to form a latch for normally retaining the said frame in operative position.

The shaft 31 serves to operate the platen or device for holding the sensitized material in printing or exposing position, the platen in the present instance embodying a carrier 35 rigidly attached to the operating shaft 31 and having a rectangular webbed frame 36 at its free end for supporting the platen proper. In printing sensitized material from negatives, it is desirable, in order to obtain the best results, to hold the sensitized material against the negative with uniform yielding pressure, and the platen shown in the present instance, comprises a spring-pressed backing 37 supported on the front face of the frame 36 by means of headed pins 38 which serve as guides for permitting a limited relative movement between the backing and the frame 36 in the direction of movement of the platen, a pair of springs 39 normally operating to yieldingly press the backing forward with the heads on the pins 38 resting against the rear side of the frame 36. The backing 37 is provided with a plate 40 having guiding pins 41 thereon extending through suitable guiding apertures in the frame 36, the said plate having apertures to receive the heads or enlargements 42 on a pad 43, a sliding bolt 44 being arranged behind the plate 40 having key-hole slots therein arranged to coöperate with the heads 42 on the pad to lock the latter to the backing. This enables pads of different sizes or forms to be employed, for, by lifting the bolt 44 the heads 42 are unlocked, permitting the pad to be removed and another of an appropriate size or form to be substituted.

The pad 43 is provided preferably with a facing of felt or other yielding material so that the sensitized material will be pressed evenly against the negative, and it is surrounded by a rim $43^a$ which is yieldingly pressed forward beyond the impression surface of the pad by the springs 45 so as to form a receptacle or ledge for supporting the sensitized material while it is being carried into engagement with the negative. To the back of the platen are pivoted a pair of ejector members 46 and 47 having ejector fingers 48 extending through the pad and adapted to operate beyond the impression surface thereof, but normally they are held retracted by means of the lateral extensions 49 thereon resting beneath the springs 45 which serve to operate the surrounding rim. These ejector members 46 and 47 are provided with lever arms 50 arranged to coöperate with the simultaneously-operable rocker-arms 51 mounted on a rock shaft 52, the latter being journaled in the backing 37 and connected by a rod 53 to a collar 54, which serves to operate the ejectors. This collar is loosely mounted on a hub 55 provided on a cam 56, the latter being fixed by a set screw or other suitable means to the operating shaft 31, (see Fig. 5) and on the periphery of this collar is formed a projection adapted to coöperate with a shoulder 57 on a spring 58, the cam 56 serving to retract the spring from its engagement with the ejector operating collar at a predetermined point in the movement of the platen. A spring 59 is preferably provided on the rock shaft 52 having a normal tendency to retract the fingers 51, the latter in turn permitting retraction of the ejectors 48, by reason of the pressure of the springs 45 bearing on the extensions 49 of the ejector plates.

In operating a printing machine employing a platen of the character described, a receptacle is provided by the rim 43ª which is yieldingly pressed forward beyond the impression surface of the platen, and this rim serves as a pocket or receptacle to support the material until the arm 35 swings sufficiently far to bring this rim into engagement with the negative, and the continued movement of the platen carrier 35 will cause the pad 43 to press the material firmly and evenly against the negative, the rim 44 yielding after engaging the negative, so as to permit the impression surface of the platen to complete its movement. In cases where the vignetter or mask is employed, the edges of the sensitized material will be covered by the vignetter or mask so that the field or view will have a border of the desired shape or design, the parts being positioned on an appropriate frame independently of the platen. The material is held in printing position for a period sufficient to effect the exposure, after which the platen is retracted. However, in the movement of the platen toward the negative, the ejector operating collar is rotated sufficiently to cause the spring to operatively engage the collar to prevent reverse movement thereof, and as the platen is retracted, this collar will remain stationary for a period of time sufficient to rock the shaft 52 and thus tilt the arms 51 against the lever arms 50 on the ejector members, the movement thus imparted to the latter causing the ejectors 48 to be simultaneously thrust forward beyond the impression surface of the platen, operation of the ejector members at the same time moving the extensions 49 thereon against the springs 45, causing the rim to be retracted simultaneously with the operation of the ejectors, the operations described causing the print to be removed automatically from the platen.

Continued movement of the platen will bring the cam 56 into operative position, disengaging the spring 58 from the projection on the collar 54 and permitting the spring 59 on shaft 52 to draw the fingers 51 back from the lever arms 50 on the ejector members, and the latter are operated to retract the ejectors by the springs 45 operating on the extensions 49 of the ejector members, and as these ejectors return to normal position, they permit the springs 45 to move the rim forwardly beyond the impression surface of the platen.

The platen-operating shaft 31 is provided with a crank 60 having a cam slot 61 therein adapted to coöperate with a pin 62 carried by the main operating member 6, the construction described being such that when the rod 6 is depressed, the pin 62 thereon operating in the cam slot of the crank 60, will cause rotation of the operating shaft 31 until it brings the platen into coöperative relation with the negative, and continued motion of the member 6 in the same direction, will cause the pin 62 to operate in a straight portion of the cam slot 61 so that it will retain the platen in fixed relation to the negative, while the main operating member continues to move.

In exposing photographic materials it is preferable to employ a shutter for cutting off the light to terminate the exposure at the right moment, and in the present embodiment of my invention I show such a shutter in connection with appropriate mechanism whereby it may be operated either at the will of the operator, or its operation may be timed automatically, the shutter 63 in the present instance being mounted on a rotatable shaft 64 so that this shutter will have a swinging movement within the printing chamber in order that it may cover and uncover the exposure opening leading to the negative and the sensitized material. This shaft 64 has a dog 65 fixed thereto having a projection 66 arranged to coöperate with a detent or latch 67, the latter being pivoted at 68 and having a spring 69 which normally operates to retain the latch and the projection on the dog in coöperative relation to detain the operation of the shutter, the opposite end of the latch being provided with a releasing arm 70. A shutter-operating member 71 is pivotally attached to the shutter-operating dog at 72, the lower end of the link having a projection 73 arranged to operate in a longitudinal slot 74 formed in the main operating member or bar 6, and on this operating bar is provided a latch 75 which is pivoted thereon at 76 and has a spring 77 normally operating to hold a projection 78 on the latch in operative position to engage the projection 73 on the shutter-operating member 71 as the operating bar is depressed, a cam surface 79 being provided on this latch for a purpose that will be presently described. For the purpose of automatically timing the period during which the shutter remains in exposing position, a suitable retarding device is provided, which as shown in the present instance, embodies a fluid retarded device comprising a cylinder 80 pivoted to the casing at 81 and having a piston 82 operating therein which is retarded in its movement by the fluid contained within the cylinder, and this piston is pivotally attached to one end of a rocking lever 83, the latter being pivoted at 84 to a pivoted arm 84ª, the latter being capable of being set by a setting lever 120 to alter the relation between the releasing arm 70 of the detent and a projection 83ª on the lever 83, this feature serving to alter the point in the movement of the retard where the shutter is released. A latch 85 is pivotally attached at 86 to the opposite end of lever 83, a shoulder 87 thereon being arranged to be engaged by the projection 73 on the shutter-operating link or member 71 as the latter descends, a spring-pressed roller 88 being preferably employed for normally holding this latch in coöperative relation with the projection on the shutter-operating member.

The retarding device has a normal tendency to return to a given position under the action of a spring 89, the free end of which bears against a suitable projection such as the pivot pin 86 on the lever 83, and in order to vary the period of time required in the operation of the retarding device before releasing the shutter, suitable means are employed for varying the strength of this spring, this being accomplished in the present instance by coiling the spring about a support 90, and attaching its free end to an arm 91 on a rotatable member 92, so that as this member is rotatably adjusted in different positions, it will vary the effective force of the spring arm bearing on the projection 86, and operating through lever 83 it will tend to return the plunger or piston 82 within the cylinder at different speeds. In order that this spring may be adjusted conveniently from the exterior of the casing, it is preferable to attach an indicator 93 to the adjustable member 92 having a projection 94 thereon arranged to rest in different recesses 94ª concentrically arranged on an index plate 95 which is visible from the exterior of the casing.

In order to set the device for either automatic or manually timed exposures, I provide a setting lever 96 which is fixed to a pivot pin 100 journaled to turn in a plate 98 said lever being provided with a projection 97 arranged to coöperate with different notches or recesses 99 in the said plate to hold the setting lever in adjusted position, the pivot pin 100 on which the said lever is mounted being extended through the supporting plate and provided with an arm 100ª carrying an inwardly-extending projection 101 arranged to operate in a slot 102 formed in a lever 103, the latter being pivoted at 104 and provided at its free end with a projection 105 (see Figs. 14 and 15). By shifting the setting lever 96 to the left, the projection 105 of lever 103 will move against the lower portion of the latch 85, causing it to disengage from the projection 73 on the shutter operating member 71, and consequently as the said member is depressed, it will fail to engage the projection 87 on the latch 85, and therefore the retard device will not operate when the shutter is swung into exposing position, whereas by swinging this setting lever 96 to the right, the projection 105 will rest clear of the latch 85, and consequently the retard device will be operated at each operation of the shutter. On the other hand the pin 101, when the setting lever 96 is in the right hand position, will rest in the path of the cam surface 79 on the latch 75, and as the latter descends to open the shutter, this projection will serve to trip the said latch and the latch 85 through the pin 85ª from the shutter-operating member 71, leaving the shutter under the control of the retarding device. However, when the closing of the shutter is timed manually by the operator, the lever 96 will occupy the left hand position, as shown in Fig. 15 carrying the projection 101 out of the path of the cam surface 79 on the latch 75, and consequently it will not trip to release the shutter, so that the shutter will remain open until the operating bar 6 is returned to normal or elevated position. A suitable signal may be employed, if desired, for notifying the operator at each closure of the shutter, and this may be provided conveniently by forming a projection 106 on the shutter-operating member 71 which is arranged to trip a bell hammer 107 on the spring arm 108 as the shutter-operating member operates to close the shutter, so that the re-coil of the spring will throw the hammer against a suitable bell 109, a spring 71ª connected to the member 71 normally operating to close the shutter.

In order to obtain the best effects while exposing the photographic material behind underexposed or thin negatives, it is preferable to employ a series of suitably-prepared screens which may be brought into position between the material and the source of light for the purpose of diffusing, subduing or otherwise modifying the light transmitted to the sensitized material, and a convenient arrangement is shown in the present embodiment of my invention comprising a frame 110 secured to the front of the casing and having a series of grooves 111, 112 and 113 therein in which holders 114, 115 and 116 operate, said holders containing the screens which are adapted to be brought into a position to intercept the light passing into the printing chamber, cords 117, 118 and 119 passing over suitably-arranged pulleys and attached to their respective holders, serving to operate them, a ring being provided on each cord adapted to be attached to suitable projections on the exterior of the frame in order that the desired screen or screens may be brought into operative position and held by the engagement of the ring with its respective projection.

In making prints or exposures with a device of the kind described, the sheets of sensitized material, preferably of the proper size, are placed one after another upon the impression surface of the platen while the latter is in retracted position, the yieldingly-operated rim 43 serving as a support to prevent the print from dropping from the platen as it assumes a vertical position. Under normal conditions the shutter is in closed position to cut off the light from the negative which has been previously clamped between the relatively-adjustable members 22 and 23 of the negative holder by movement of the lever 26, the negative being positioned relatively to the platen by means of the adjusting screws 15, 16 and 17. Should it be desired to make exposures, the duration of which is timed automatically, the setting lever 96 is moved toward the right as indicated in Fig. 14, thereby holding the projection 105 clear of the latch 85, and bringing the projection 101 into position to trip the latch 75 at the proper moment. By depressing the treadle 4 the main operating bar 6 will be moved from the position shown in Fig. 12 toward the position shown in Fig. 11, and this will first cause the pin 62 operating in the cam slot 61 of the crank 60 to rotate the platen-operating shaft 31 to bring the platen and the sensitized material thereon into coöperative relation with the negative, and as the bar 6 continues to move downwardly, the pin 62 will travel in a straight portion of the cam slot 61 so that the platen will pause or remain motionless, pressing the sensitized material with a yielding pressure against the rear surface of the negative. However, as this pin enters the straight portion of the cam and at a time when the platen is in engagement with the negative, the latch 75 on the bar 6 will reach a point where the projection 78 thereon engages the projection 73 on the shutter-operating member 71, and the continued movement of the bar 6 will cause the member 71 to be depressed, rotating the dog 65 to which the shutter is attached and bringing the projection 66 thereon into latching engagement with the detent 67, the detent thus serving to automatically latch and hold the shutter in open or exposing position. The downward movement of the shutter-operating member 71 in turn will bring the projection 73 thereon against the projection 87 on the latch 85, causing the latch to be lowered to set the retarding device in operative position. A moment after the detent has latching engagement with the shutter-retaining dog the pin 101 controlled by the setting lever 96, will coöperate with the cam surface 79 on the latch 75 to trip or disengage it and latch 85 from the projection 73 on the shutter-operating member.

During the exposure, the treadle 4 is held down either manually or by use of the detent 8, and the shutter is held open or in exposing position under control of the retarding device. As the plunger 82 of the retarding device is gradually forced into the cylinder by the action of the spring 89, the lever 83 will slowly tilt toward normal position, causing the projection 83ª thereon to engage the arm 70 on the detent at a predetermined point in the movement of this lever, and continued movement of this lever 83 will disengage the detent from the dog, thus allowing the shutter to swing immediately into closed position and thus terminate the exposure.

In order that the periods of the exposures may be varied, the pivot 84 for the lever 83 is preferably capable of being shifted, as by mounting it on the pivoted arm 84ª and by shifting this pivot to the right or left by means of the setting lever 120 coöperating with the series of notches 121, the time elapsing between the tripping of the shutter and the engagement of the pin 83ª with the release arm 70 of the detent, will be either advanced or delayed, as desired, or if necessary, the strength of the spring 89, operating to return the retard to normal position may be adjusted by the setting lever 93 to change the speed of operation of the retarding device, this being accomplished by setting of the lever 93.

In some instances it is preferable to time the length of the exposures at the will of the operator, and in such cases the setting lever 96 is moved into the left hand position, as shown in Fig. 15, and this will bring the projection 105 thereon into engagement with the latch 85 of the retard device, causing it to swing clear of the projection 73 on the shutter-operating member 71. Then as the bar 6 is depressed, the platen will be swung into coöperative relation with the negative by means of the crank 60, the cam slot 61 therein and the projection 62 on the bar coöperating therewith, and as this bar descends, the latch 75 will engage the projection 73 on the shutter-operating member 71, causing it to be lowered and thus open the shutter. However, this latch 75 will remain in engagement with the projection 73, for the reason that the pin 101 at this time will be clear of the path of the cam surface 79 on latch 75, and at the same time the retard will not be brought into operation as the latch 85 connected thereto rests clear of the projection 73, and as this lever 83 remains inoperative, or in the position shown in Fig. 12, the projection 83ª thereon will engage the arm 70 of the latch or detent to prevent latching engagement between it and the dog of the shutter, and consequently the shutter will not be latched, but will remain in open or exposing position only as long as the bar 6 remains in operated position, for as soon as the latter reaches a predetermined point in its upward or return movement, the shutter will be allowed to move toward closed position by the retraction of the latch 75 and the projection 73 following it, and the continued return movement of the main operating member 6 will carry the projection 62 out of the straight portion of the cam on the crank 60 and this will retract the platen to release the print or exposed material.

In order to avoid the necessity of handling the prints after exposure, it is preferable to employ a drawer 221 arranged to slide into and out of the casing and forming a substantially closed or light tight receptacle for the prints, a deflector 122 being arranged between the under side of the platen and the receptacle forming a chute for receiving the exposed prints as they are ejected from the platen and convey them into the receptacle from which they may be removed as desired for developing toning or other subsequent treatment.

The various parts of the shutter mechanism are preferably mounted on a solid support or plate 123 secured to the casing, and the main operating member 6 operates through suitable bearings 124 and 125 on this plate, the support thus provided serving to hold the shutter mechanism in proper relation so as to insure perfect operation thereof at all times, and in order to render these parts conveniently accessible for adjustment or other purposes, the plate 95 carrying the exposure setting levers 94 and 120, and the plate 98 carrying the setting lever 96 for changing the exposures from automatic to manually-timed and vice versa, are preferably arranged in fixed relation to the shutter supporting plate 123, a door or cover 126 being hinged to the casing at 127 and having apertures suitably arranged therein through which the respective setting levers are operable, a similar door 128 being pivoted to the casing at 129, and having hasps or fastening devices 130 thereon arranged to coöperate with suitably-arranged projections 131 on the door 126 to hold both doors in closed or fastened position.

A printing machine constructed in accordance with my invention is particularly desirable in cases where it is required to make a large number of photographic prints from negatives, for the shutter-controlling devices provided insure an equal exposure for all the prints, so that after the proper length of exposure has been determined for each negative by experiment, the shutter-controlling devices may be set to give all prints made from a given kind of sensitized material, an equal exposure, for not only is provision made for varying the length of the exposures according to the density of the negatives, but such a range of adjustment is provided that the same machine may be employed for exposing materials varying greatly in sensitiveness. Moreover, the arrangement and mode of operation of the parts greatly facilitates handling of the material so that needless exposure to the light that tends to blur or destroy the definition of the prints is avoided, and considerable time is saved the operator by reason of this convenient arrangement and automatic operation of the parts.

I claim as my invention:

1. In a photographic printing device, the combination with a platen for holding the sensitized material in printing position, and an actuating device therefor, of a shutter, connections between the latter and one of said members for setting the shutter in open or exposing position by the actuation of that member, a latch for retaining the shutter in open or exposing position, devices coöperating with said latch for automatically timing the release of the shutter, and means for disconnecting said devices from operative relationship with the latch.

2. In a photographic printing device, the combination with a platen for positioning the photographic material, and a shutter for determining the exposure of the material, of a reciprocatory-operating member, a latch thereon for operatively connecting it to the shutter when the member is operated in one direction, a crank operatively connected to the platen having a cam thereon, and a projection on said member coöperating with the cam on said crank to cause relatively timed movements of the shutter and platen.

3. In a photographic printing device, the combination with a device for positioning photographic material in printing position, and a shutter for controlling the exposures of the material, of an operating member, a pivoted latch carried on said member arranged to set the shutter in exposing position when the member is moved in one direction, and a tripping device adjustable into and out of operative position to disconnect the latch and shutter.

4. In a photographic printing device, the combination with a device for holding the photographic material in printing position, and a shutter for controlling the exposures of the material, of a latch for holding the shutter in exposing position, a retarding device serving to operate the latch into releasing position, an operating member independent of the latch serving to set the shutter and retarding device in exposing position, and means for temporarily disconnecting the operating member from operative relation with the retarding device to enable the operating member to set the shutter without affecting the retarding device.

5. In a photographic printing device, the combination with a device for holding the photographic material in printing position, and a shutter for controlling the exposures, of a latch for retaining the shutter in exposing position, a retarding device arranged to coöperate with said latch to release the shutter, an operating member having a latch thereon for setting the shutter in exposing position, a latch connected to the retarding device and operated by the movement of the operating member to set the retarding device, and a device for simultaneously tripping the latches which serve to set the shutter and retarding device.

6. In a photographic printing device, the combination with a device for holding the photographic material in printing position, and a shutter for controlling the exposures, of an operating member having a latch thereon for setting the shutter in exposing position, a retarding device for timing the closing of the shutter having a latch thereon operated by the movement of the operating member to set the retarding device in operative position, and an exposure setting device arranged to render the latch of the retarding device inoperative when adjusted in one position, and serving to disengage both latches at a predetermined moment when the setting device occupies a different position.

7. In a photographic printing device, the combination with a device for holding the photographic material in printing position, and a shutter for controlling the exposures thereof, of an operating member for setting the shutter in exposing position, a latch operating automatically to retain the shutter in exposing position, and a retarding device set by movement of the operating member and operating to release the latch.

8. In a device for exposing photographic materials, a shutter for controlling the exposures, an operating member for setting the shutter in exposing position, a latch for holding the shutter in exposing position, a retarding device set in operative position by the movement of the operating member and serving to move said latch into releasing position, and means for adjusting the relation between the latch and the coöperating part of the retarding device to vary the duration of the exposures.

9. In a device for exposing photographic materials, a shutter for controlling the exposures, a shutter-operating member connected thereto having a projection thereon, a main operating member having a part thereon arranged to coöperate with the shutter-operating member to set it in exposing position, a latch for retaining the shutter in exposing position, a retarding device arranged to coöperate with said latch to release the shutter, a latch arranged to coöperate with a part on the shutter-operating member to set the retarding device by the movement of said member, and a device for disconnecting the shutter-operating and retarding devices from the main operating member after the shutter has been latched in exposing position.

10. In a photographic printing device, the combination with a printing chamber adapted to receive light from a suitable source and a negative holder adapted to support a negative in exposing position, of a platen for moving the photographic material into coöperative relation with the negative, and a rim yieldingly held beyond the impression surface of the platen for supporting the material on the platen.

11. In a photographic printing device, the combination with a suitable printing chamber adapted to receive light from a suitable source, and a holder for supporting a negative in printing position, of a platen for carrying the sensitized material into coöperative relation with the negative, and an ejector arranged to operate at a given point in the movement of the platen for removing the exposed material from the platen.

12. In a photographic printing device, the combination with a suitable printing chamber adapted to receive light from a suitable source, and a holder for supporting a negative in coöperative relation therewith, of a platen for carrying the sensitized material into printing position relatively to the negative, a rim yieldingly pressed forward beyond the impression surface of the platen for supporting the material, ejectors for removing the material from the platen, and means for simultaneously moving the ejectors into operative position and retracting the supporting rim.

13. In a photographic printing device, the combination with a suitable printing chamber adapted to receive light from a suitable source, and a negative holder arranged in coöperative relation therewith, of a platen for carrying the sensitized material into coöperative relation with the negative embodying a carrier and a pad detachably secured to the carrier and serving to receive the photographic material.

14. In a photographic printing device, the combination with a printing chamber adapted to receive light from a suitable source, and a negative holder arranged in coöperative relation therewith, of a platen embodying a carrier arm, a pad arranged on the front thereof and adapted to receive the photographic material, and a locking device for connecting the parts comprising a movable locking bar on one of the parts, and locking projections on the other part adapted to coöperate with the locking bar.

15. In a photographic printing device, the combination with a suitable printing chamber, of a platen for carrying the photographic material into coöperative relation therewith embodying a movable carrier arm, a backing guided on said arm and yieldingly pressed forwardly, and a pad supported on said backing and adapted to receive the material to be printed.

16. In a photographic printing device, the combination with a suitable printing chamber, of a platen for carrying the sensitized material to be printed into coöperative relation therewith embodying a pad adapted to receive the material, a rim arranged to coöperate therewith and serving to support the material, springs normally operating to project said rim beyond the pad, ejector members having portions arranged to remove the material from the pad and extensions arranged to coöperate with the operating springs for the rim to retract the latter when the ejector portions are in operative position.

17. In a photographic printing device, the combination with a suitable printing chamber, of a platen for positioning the photographic material embodying a swinging carrier arm, a backing thereon, a pad carried by the backing and adapted to receive the photographic material, a rim arranged at the edge of the pad for supporting the material, springs normally operating to press the rim forwardly beyond the impression surface of the pad, ejector members fulcrumed on a part of the platen, ejector fingers arranged on one end of each member arranged to be projected beyond the impression surface of the pad to receive the material from the platen, and extensions on the opposite ends of the members arranged to coöperate with the operating springs for the rim for retracting the latter when the ejector fingers are in operative position.

18. In a photographic printing device, the combination with a suitable printing chamber, and a negative holder for supporting a negative in operative position relatively thereto, of a platen for carrying the photographic material into coöperative relation with the negative, ejecting devices arranged on the platen for removing the material therefrom, and means for operating the ejecting devices at a given point in the movement of the platen.

19. In a photographic printing device, the combination with a suitable printing chamber adapted to receive light from a suitable source, of a platen for carrying the photographic material into printing position embodying an operating shaft operatively connected to the platen, ejecting devices on the platen arranged to operate to remove the material therefrom, a collar loosely mounted on said shaft and operatively connected to the ejecting devices, a device arranged to coöperate with said collar to cause a relative movement between it and the platen to operate the ejecting devices, and means for disengaging said collar and said device.

20. In a printing device, the combination with a printing chamber, of a platen arranged to coöperate therewith embodying a rotatable operating shaft, operatively connected to the platen, ejecting devices carried by the platen for removing the material therefrom, a collar loosely mounted on said shaft and operatively connected to the ejecting devices, a spring arranged to coöperate with a part of the collar to cause relative movement between it and the platen to operate the ejecting devices, and a cam operated by the shaft for releasing the collar and spring.

21. In a printing device, the combination with a suitable printing chamber, of a platen coöperatively arranged therewith having ejecting devices thereon for removing the material therefrom, a rock shaft journaled on the platen, a spring normally operating on said shaft to permit retraction of the ejecting devices, and operating devices set in motion by the movement of the platen for rotating said shaft to set the ejecting devices in operation.

22. In a photographic printing device, a negative holder embodying coöperatively arranged members, each having a pair of angularly arranged negative engaging surfaces forming a rectangular frame, said members being arranged on one diagonal of the latter and means for adjusting said members relatively on the other diagonal to secure a negative between them.

23. A negative holder embodying a pair of coöperatively-arranged members each having arms extending at right angles forming a substantially rectangular form to receive the negatives, one of the members having inclined slots, and projections coöperating therewith to cause a proximating movement of the members, and a lever coöperating with the adjustable member for operating it.

24. In a photographic printing device, the combination with a suitable printing chamber, and a movable platen for holding the sensitized material in printing position, of a negative holder for supporting a negative in operative position in the printing chamber and in coöperative relation with the platen and adjustable laterally of the path of movement of the latter.

25. In a photographic printing device, the combination with a suitable printing chamber adapted to contain a negative, and a platen for carrying the material into coöperative relation with the negative, of a movable frame surrounding the platen in the chamber in proximity to the negative and adapted to adjustably support a vignetting mask in registration with the negative and a mask mounted on the frame.

26. In a photographic printing device, the combination with a suitable printing chamber, a negative supported therein, and a platen for carrying the material into coöperative relation with the negative, of a movable frame surrounding the platen in the chamber for supporting a vignetting mask in coöperative relation with the negative, a latch for retaining said frame in operative position relatively to the platen and negative and a mask supported on the frame.

27. In a photographic printing device, the combination with a suitable printing chamber, a negative holder for supporting a negative therein, and a platen for moving the material into coöperative relation with the negative, of an open frame surrounding the platen for supporting a vignetting mask in coöperative relation with the negative and having projections for engaging a portion of a mask, a hinged plate coöperating with the projections and a vignetting mask supported on the projections.

FRANK A. BROWNELL.

Witnesses:
G. WILLARD RICH,
CLARENCE A. BATEMAN.